(12) United States Patent
Mildner et al.

(10) Patent No.: US 8,590,663 B2
(45) Date of Patent: Nov. 26, 2013

(54) MOTOR VEHICLE BODY

(75) Inventors: Udo Mildner, Limburg (DE); Karsten Bohle, Bad Schwalbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/447,367

(22) Filed: Apr. 16, 2012

(65) Prior Publication Data

US 2012/0261952 A1    Oct. 18, 2012

(30) Foreign Application Priority Data

Apr. 16, 2011   (DE) .................. 10 2011 017 342

(51) Int. Cl.
*B62D 21/02*    (2006.01)

(52) U.S. Cl.
USPC .... 180/312; 180/291; 180/299; 280/124.109; 280/781; 296/203.02

(58) Field of Classification Search
USPC .................. 180/291, 299, 312; 280/124.109, 280/124.111, 124.125, 781, 785, 788; 296/193, 193.07, 193.09, 203.02
See application file for complete search history.

(56) References Cited

U.S. PATENT DOCUMENTS

| | | | | |
|---|---|---|---|---|
| 3,517,765 A | * | 6/1970 | Eggert, Jr. et al. ............ | 180/312 |
| 6,390,437 B1 | * | 5/2002 | Hong ............................. | 248/559 |
| 6,773,057 B2 | | 8/2004 | Nomura | |
| 7,559,402 B2 | * | 7/2009 | Jennings et al. .............. | 180/312 |
| 7,828,330 B2 | * | 11/2010 | Tamura et al. ................ | 280/788 |
| 7,845,662 B2 | * | 12/2010 | Ogawa et al. .......... | 280/124.109 |
| 2008/0303237 A1 | * | 12/2008 | Preijert .................. | 280/124.125 |
| 2010/0171340 A1 | * | 7/2010 | Yasuhara et al. .............. | 296/205 |
| 2010/0230981 A1 | | 9/2010 | Hock et al. | |

FOREIGN PATENT DOCUMENTS

| | | |
|---|---|---|
| DE | 10348354 A1 | 6/2005 |
| DE | 102005029292 A1 | 10/2006 |
| DE | 102006036852 A1 | 2/2008 |
| DE | 60317743 T2 | 11/2008 |
| EP | 1081023 A1 | 3/2001 |
| FR | 2937944 A1 | 5/2010 |
| WO | 2005012066 A1 | 2/2005 |

OTHER PUBLICATIONS

UK IPO, British Search Report for Application No. 1205818.6, dated Jul. 9, 2012.
German Patent Office, German Search Report dated Nov. 14, 2011 for German Application No. 102011017342.0.

* cited by examiner

*Primary Examiner* — Joseph Rocca
*Assistant Examiner* — Darlene P Condra
(74) *Attorney, Agent, or Firm* — Ingrassia Fisher & Lorenz, P.C.

(57) ABSTRACT

A support structure for a motor vehicle body includes, but is not limited to a longitudinal girder extending between an engine compartment and a wheel installation space, a wheel installation strut extending over the wheel installation space, an engine frame, an attached bracket protruding downward on the longitudinal girder, which supports the longitudinal girder on the engine frame, and a one-piece reinforcement element, of which a first arm flanks the bracket and a second arm extends in the direction of the wheel installation strut.

8 Claims, 3 Drawing Sheets

MOTOR VEHICLE BODY

CROSS-REFERENCE TO RELATED APPLICATION

This application claims priority to German Patent Application No. 10 2011 017 342.0, filed Apr. 16, 2011, which is incorporated herein by reference in its entirety.

TECHNICAL FIELD

The technical field relates to a structure of a motor vehicle body, in particular the front area of such a vehicle body. The load-bearing components of such a vehicle body are to be as lightweight as possible, on the one hand, in order to allow fuel-saving operation of the vehicle, on the other hand, they must have a high stiffness, in order to provide the vehicle body with the torsional strength required for normal driving operation and to ensure effective occupant protection in the event of accidents.

BACKGROUND

Longitudinal girders, which typically extend on both sides of an engine compartment and below a passenger compartment of the vehicle and are connected to one another at various points by crossbeams to form a rigid framework, have a high significance for the stability of the vehicle body. In a front area of the motor vehicle body, the longitudinal girders extend in an arc over the front axle, which is in turn installed together with the engine on an engine frame separate from the longitudinal girders. The engine frame is connected via front and rear attachments to the framework formed by the longitudinal girders so that it is capable of oscillating. A height difference between the engine frame and the longitudinal girders must be bridged in particular at a front attachment. A bracket required for this purpose can be fastened on the engine frame or on the longitudinal girder, the fastening on the longitudinal girder typically being the simpler variant to manufacture.

As in the entire vehicle body, a compromise must also be found between stiffness and weight in the bracket, it being considered that in particular forces occurring in the vehicle transverse direction between engine frame and longitudinal girder can exert a substantial torsional torque on the longitudinal girder via the bracket.

In view of the foregoing, at least one object is to provide a structure for a motor vehicle body having an attached bracket protruding downward on a longitudinal girder, in which the bracket has a high carrying capacity in spite of low weight. In addition, other objects, desirable features, and characteristics will become apparent from the subsequent summary and detailed description, and the appended claims, taken in conjunction with the accompanying drawings and this background.

SUMMARY

A motor vehicle body is provided having a longitudinal girder extending between an engine compartment and a wheel installation space, a wheel installation strut extending over the wheel installation space, an engine frame, and an attached bracket protruding downward on the longitudinal girder, which supports the longitudinal girder on the engine frame, a one-piece reinforcement element is provided, of which a first arm flanks the bracket and a second arm extends in the direction of the wheel installation strut, in order to also support the bracket against bending loads on the wheel installation strut.

In order to achieve the desired support effect, the second arm can itself preferably extend directly up to the wheel installation strut and engage thereon. If a rigid connecting element which engages on longitudinal girder and wheel installation strut is provided, the second arm could also only be supported on this connecting element, without reaching the wheel installation strut itself. In order to minimize the weight of the bracket, it can be implemented as a hollow body open toward the wheel installation space, which is stiffened in that the first arm of the reinforcement element closes the open side of the hollow body.

In particular, this first arm can expediently have a U-shaped cross-section having edge sections fastened on the bracket. Correspondingly, the second arm can also have a U-shaped cross-section, whose open side is closed by a closing part extending from the longitudinal girder up to the wheel installation strut. The closing part can in particular form the above-mentioned rigid connecting element between longitudinal girder and wheel installation strut.

The reinforcement element is expediently also fastened on a side wall of the longitudinal girder facing toward the wheel installation strut. An opening formed in the reinforcement element at the height of a lower edge of the side wall is useful for guiding through a tool, if the reinforcement element is only joined with a U-profile element after it is attached to the side wall, in order to form the longitudinal girder. If the side wall and the U-profile element of the longitudinal girder are connected along an upper edge of the side wall, the reinforcement element is expediently to end below this upper edge, in order to leave space for the engagement of the closing part at the height of the upper edge.

To improve the resistance of the bracket against forces acting in the vehicle transverse direction, a tongue of a side wall of the bracket facing toward the engine compartment is to be fastened on a side wall of the longitudinal girder facing toward the engine compartment. In order to convert a force acting in the transverse direction of the vehicle body into a tensile force in the longitudinal direction of the tongue, it is also expedient if a front wall and a rear wall of the bracket have upper edges, which press against a bottom side of the longitudinal girder.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
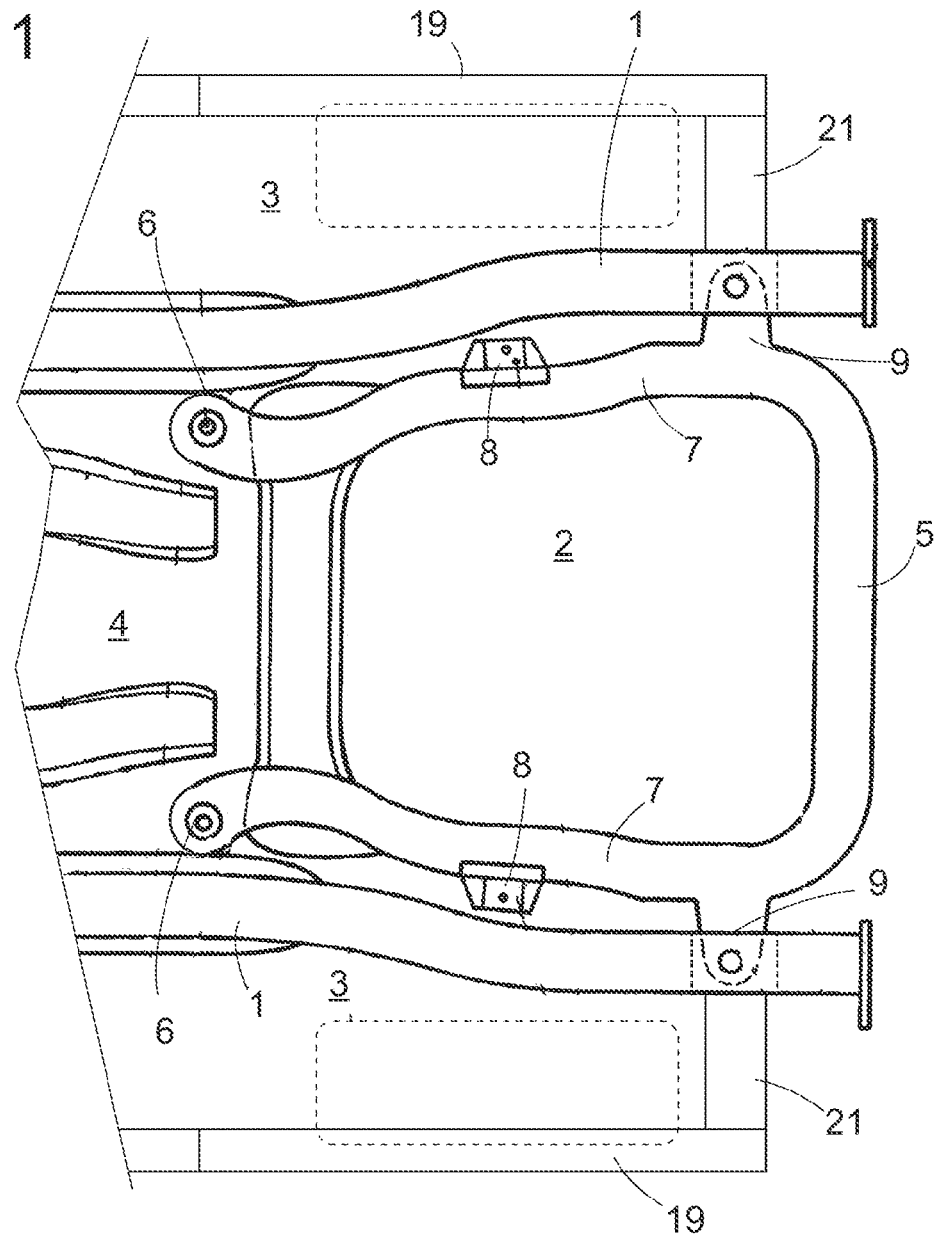
FIG. 1 shows a schematic top view of parts of a motor vehicle body.
Figure 2:
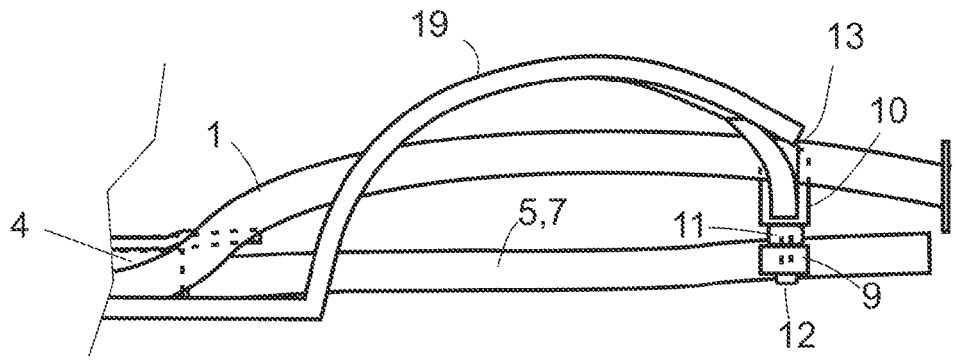
FIG. 2 shows a side view of the parts shown in FIG. 1.

FIG. 1 shows a schematic top view of several load-bearing components of the front part of a motor vehicle body. Two longitudinal girders 1 extend between an engine compartment 2 and installation spaces 3 for front wheels of the motor vehicle (indicated by dashed lines in the figure). The longitudinal girders 1 are connected behind the engine compartment 2 by a floor plate 4. An engine frame 5 extends in the engine compartment 2 approximately at the height of the floor plate 4 and is connected via rear engagement points 6 thereto and via front engagement points to the longitudinal girders 1 so it is capable of oscillating. The front engagement point each comprise an elastic cushion 11, which is clamped between an arm 9 protruding laterally from a longitudinal leg 7 of the approximately rectangular engine frame 5 and a bracket 10 protruding downward from one of the longitudinal girders 1. Mounts 8 for the front axle are arranged on the longitudinal legs approximately in the middle between the front and rear engagement points. As shown in FIG. 2, the longitudinal girders 1 each describe an upwardly curved arc at the level of the engine compartment 2, so as not to obstruct steering and spring movements of the front axle. The rear engagement points, which are concealed in FIG. 2, comprise elastic cushions like the front engagement points, which allow damped oscillations of the engine frame 5 relative to the longitudinal girders 1 or the floor plate 4 in the vertical direction. The cushions of the rear engagement points are clamped between engine frame and floor plate.

The engine frame 5 is secured on each of the brackets 10 via a head bolt 12 and horizontally limited in its movement freedom. The head bolt 12 penetrates holes of the arm 9 and the cushion 11 and is immovably anchored in the bracket 10. The rear engagement points of the engine frame 5 (not visible in FIG. 2) on the floor plate 4 are constructed accordingly. Since the floor plate 4 and the engine frame 5 are at essentially the same height, strong forces acting in the vehicle longitudinal direction can be introduced via the rear engagement points 6 securely into the floor plate 4 and the longitudinal girders 1. Forces acting in the vehicle transverse direction must be largely introduced into the longitudinal girders 1 via the front engagement points between the arms 9 and the brackets 10.

Figure 3:
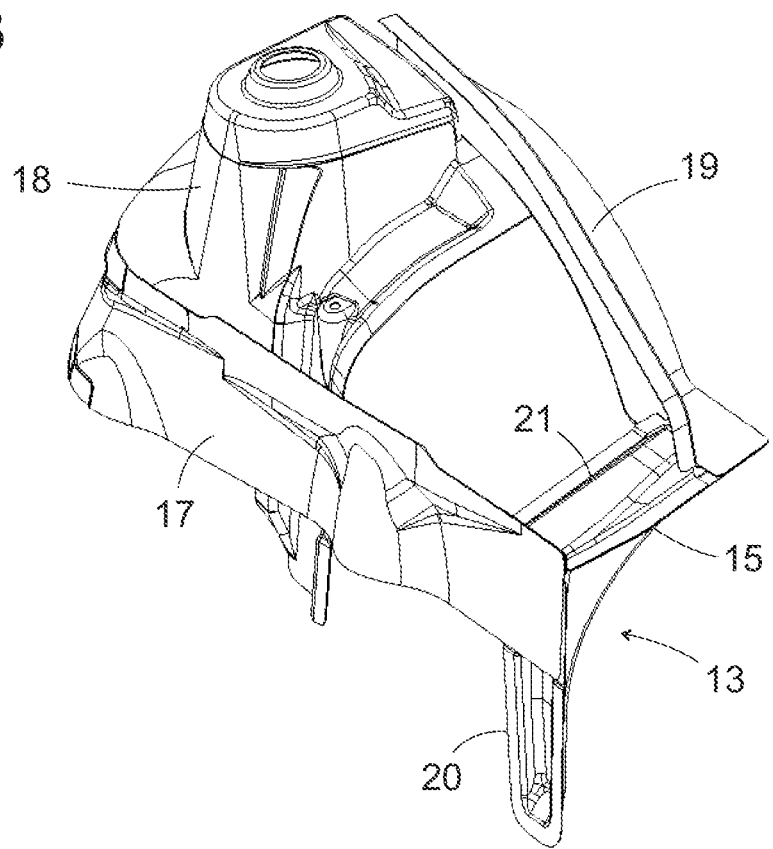
FIG. 3 shows a perspective view of an assembly used during the assembly of the vehicle body of FIG. 1 and FIG. 2.
Figure 4:
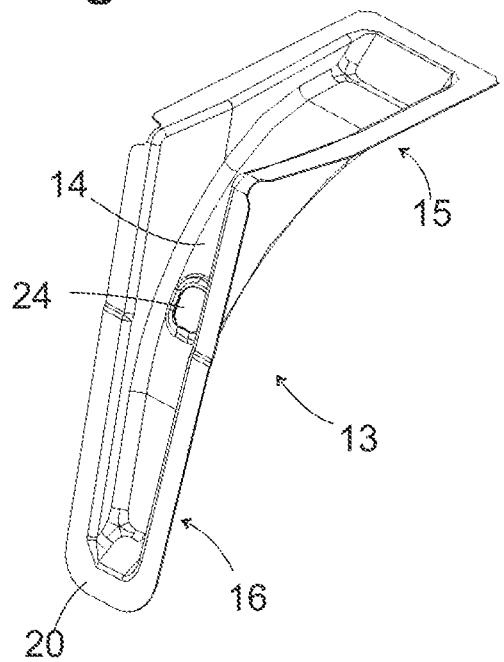
FIG. 4 shows a view of a reinforcement element used in the assembly of FIG. 3.

In order to ensure the stiffness of the brackets 10 required for this purpose, the stiffening element 13, which is shown in FIG. 4 in a perspective view and is shaped in one piece from a sheet-metal blank, is provided. It comprises two arms 15, 16, which are connected via a uniformly curved arc 14 and are aligned at an obtuse angle to one another, each having a hat-shaped cross section. FIG. 3 shows the stiffening element 13 installed in an assembly, which also comprises a side wall 17 of the left longitudinal girder 1, a wheel housing 18 delimiting the installation space of the left front wheel, and a wheel installation strut 19 extending in the arc over the installation space 3. The free end of the diagonally rising arm 15 of the stiffening element 13 is welded to a front end of the wheel installation strut 19. An upper half of the arm 16 directed vertically upward is welded to the side wall 17; the lower half of the arm 16 forms a U-shaped welding flange 20, which extends the wall 17 flush downward.

Figure 5:
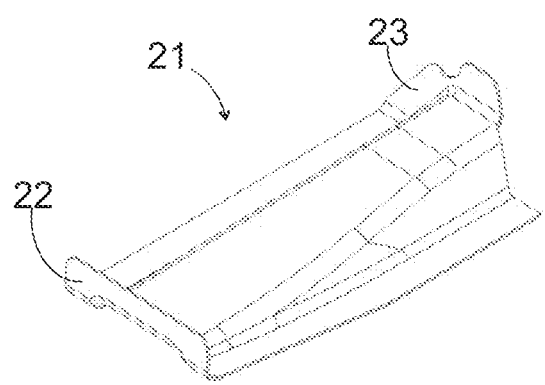
FIG. 5 shows a view of a closing part of the assembly.

A closing part 21 shown in FIG. 5 is provided to be installed on the top side of the arm 15 exposed between side wall 17 and wheel installation strut 19. The closing part 21 has a hat-shaped cross section like the arm 15. Elongated edge strips of the closing part 21 and the arm 15, which each correspond to a brim of the hat cross-section, are welded on one another. Vertical welding flanges 22, 23 on the ends of the closing part 21 are provided for fastening on an upper edge of the side wall 17 or an inner side of the wheel installation strut 19.

Figure 6:
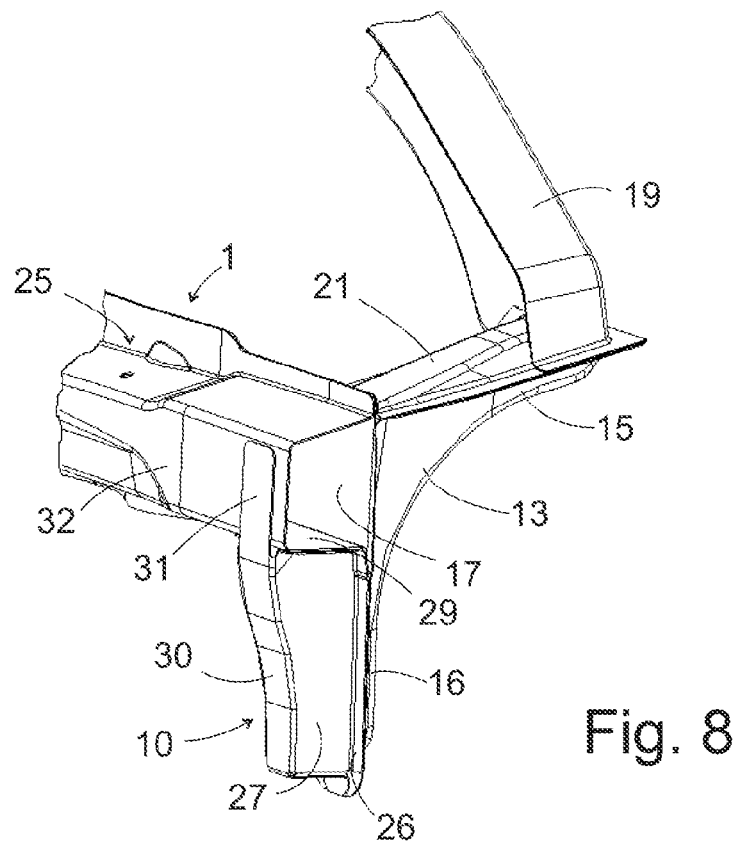
FIG. 6 shows a partial view of the assembly installed on a longitudinal girder of the vehicle body.
Figure 7:
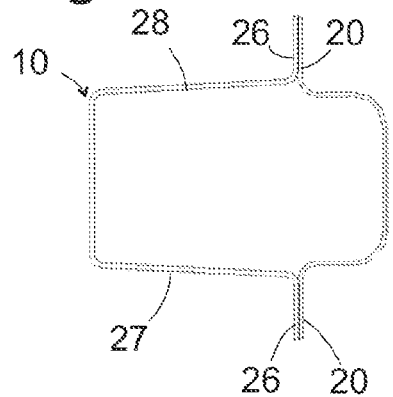
FIG. 7 shows a horizontal section through a bracket protruding downward from the longitudinal girder and an arm of the reinforcement element fastened on the bracket.

An opening 24 in the arc 14 of the stiffening element 13, which is visible in FIG. 4, is located in the assembly of FIG. 3 approximately at the height of a lower edge of the side wall 17 and allows a welding tool to be guided to this lower edge, if, during installation of the assembly in a vehicle, the side wall 17 is to be welded to a U-profile 25 (see FIG. 6), which is open to the side, in order to form the left longitudinal girder 1. FIG. 6 shows this left longitudinal girder 1 and the front part of the assembly welded thereon, a front end of the longitudinal girder 1 being shown cut away in the illustration, in order to be able to show the stiffening element 13 and the closing part 21 of the assembly more completely. The downwardly directed arm 16 flanks the bracket 10, and its U-shaped welding flange 20 is welded to a welding flange 26, which is congruent thereto, of the bracket 10. The bracket 10 and the arm 16 of the stiffening element 13 supplement one another to form a hollow body of essentially rectangular cross-section, from which the welding flanges 20, 26 protrude to the rear and to the front, as visible in the horizontal section of FIG. 7.

The welding flange 26 is extended on each of the front and rear walls 27, 28 of the bracket 10 by flanges, which are angled from the upper edges of these walls and are essentially horizontal, and which are not visible in the figures and are welded to a lower flank 29 of the U-profile 25. A side wall 30 of the bracket 10 facing toward the engine compartment 2 is extended beyond the upper edges of front and rear walls 27, 28 by a tongue 31, which is fastened on a side wall 32 of the U-profile 25 facing toward the engine compartment. The bracket 10 is thus secured against forces acting at its lower end in the lateral direction, on the one hand, by the stiffening element 13, which dissipates these forces partially via the wheel installation strut 19, and on the other hand, by the tongue 31, which can be highly loaded by tension.

Figure 8:
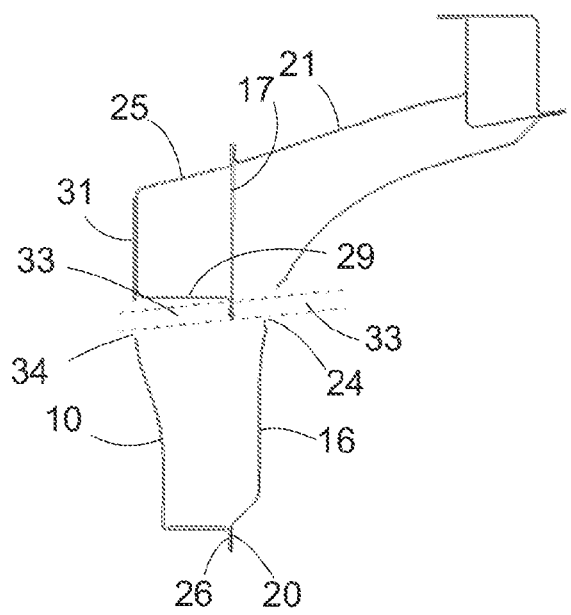
FIG. 8 shows a cross-section through the longitudinal girder and the assembly.

FIG. 8 shows a cross-section through the fully installed assembly and the bracket 10 along a central plane of the stiffening element 13. Like the longitudinal girders 1, the wheel installation strut 19 is also a hollow profile welded together from two elongated sheet-metal blanks. Two welding tool tips 33 for welding the side wall 17 and the U-profile 25 along their lower edges are shown as dashed outlines. One of the tips 33 penetrates the opening 24 of the stiffening element 13. A corresponding opening 34 for the other tip 33 could also be provided on the bracket 10. However, in order to avoid weakening the side wall 30 at the base of the tongue 31, the side wall 30 is preferably closed, as shown in FIG. 6, and the bracket 10 is only attached after the assembly of FIG. 3 is welded on the U-profile 25 with the aid of the tips 33.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A support structure for a motor vehicle body, comprising:

a longitudinal girder extending between an engine compartment and a wheel installation space;

a wheel installation strut extending over the wheel installation space;

an engine frame; and an attached bracket protruding downward on the longitudinal girder, which supports the longitudinal girder on the engine frame and a one-piece reinforcement element of which a first arm is configured to flank the attached bracket and a second arm extends in a direction of the wheel installation strut, wherein the attached bracket is a hollow body open toward the wheel installation strut, and the first arm is configured to close the open side of the hollow body.

2. The support structure according to claim 1, wherein the first arm comprises a U-shaped cross-section having edge sections fastened on the attached bracket.

3. The support structure according to claim 1, wherein the second arm engages on the wheel installation strut.

4. A support structure for a motor vehicle body, comprising:

a longitudinal girder extending between an engine compartment and a wheel installation space;

a wheel installation strut extending over the wheel installation space;

an engine frame; and an attached bracket protruding downward on the longitudinal girder, which supports the longitudinal girder on the engine frame and a one-piece reinforcement element of which a first arm is configured to flank the attached bracket and a second arm extends in a direction of the wheel installation strut, wherein the second arm comprises a U-shaped cross-section and a closing part, which extends from the longitudinal girder up to the wheel installation strut and closes an open side of the second arm.

5. A support structure for a motor vehicle body, comprising:

a longitudinal girder extending between an engine compartment and a wheel installation space;

a wheel installation strut extending over the wheel installation space;

an engine frame; and an attached bracket protruding downward on the longitudinal girder, which supports the longitudinal girder on the engine frame and a one-piece reinforcement element of which a first arm is configured to flank the attached bracket and a second arm extends in a direction of the wheel installation strut, wherein the one-piece reinforcement element is fastened on a side wall of the longitudinal girder facing toward the wheel installation space.

6. The support structure according to claim 5, wherein the one-piece reinforcement element has an opening at a height of a lower edge of the side wall.

7. The support structure according to claim 5, wherein the side wall and a U-profile element of the longitudinal girder are connected along an upper edge of the side wall and the one-piece reinforcement element is configured to end below the upper edge.

8. The support structure according to claim 7, wherein the attached bracket comprises a front wall and a rear wall having upper edges press against a bottom side of the longitudinal girder, and a tongue of the side wall of the attached bracket facing toward the engine compartment, which extends beyond the upper edges of the front wall and the rear wall, is fastened on the side wall of the longitudinal girder facing toward the engine compartment.

\* \* \* \* \*